US 6,685,596 B2

(12) United States Patent
Goto et al.

(10) Patent No.: US 6,685,596 B2
(45) Date of Patent: Feb. 3, 2004

(54) VARIATOR DISC AND A METHOD OF FABRICATING THE SAME

(75) Inventors: Masao Goto, Habikino (JP); Kiichiro Yamashita, Kashiwara (JP); Shinji Yasuhara, Yamatokoriyama (JP)

(73) Assignee: Koyo Seiko Company, Ltd., Osaka (JP)

( * ) Notice: Subject to any disclaimer, the term of this patent is extended or adjusted under 35 U.S.C. 154(b) by 85 days.

(21) Appl. No.: 10/083,384

(22) Filed: Feb. 27, 2002

(65) Prior Publication Data

US 2002/0119862 A1 Aug. 29, 2002

(30) Foreign Application Priority Data

Feb. 28, 2001 (JP) ........................................ 2001-054736

(51) Int. Cl.[7] .............................................. F16H 15/38
(52) U.S. Cl. ........................... 476/73; 476/40; 148/319; 148/571; 148/573
(58) Field of Search .............................. 476/40, 42, 72, 476/73; 148/316, 319, 906, 573; 29/893; 266/123, 129

(56) References Cited

U.S. PATENT DOCUMENTS 5,556,348 A    9/1996   Kokubu et al.
6,066,068 A    5/2000   Takemura et al.

FOREIGN PATENT DOCUMENTS

| JP | 6-159463    | 6/1994  |
| JP | 8-283861    | 10/1996 |
| JP | 9-014373    | 1/1997  |
| WO | WO 00/77265 A1 | 12/2000 |

OTHER PUBLICATIONS

Copy of European search report corresponding European Appln. No. EP 02 00 4675 dated Jun. 21, 2002.

Primary Examiner—William C. Joyce
(74) Attorney, Agent, or Firm—Smith, Gambrell & Russell, LLP

(57) ABSTRACT

A blank for disc is heat treated for adjusting a surface hardness thereof to not less than Hv700. The blank has a spline hole thereof heated by high frequency heating while cooling a race thereof. Subsequently, the spline hole is subjected to slow cooling. Thus is obtained a disc having a surface hardness of not less than Hv700 at the race, and a surface hardness of not more than Hv600 at the spline hole, the disc wherein at least a thin portion is varied in hardness between a hardened layer of a bottom of the spline hole and a hardened layer of the race by an amount of not less than Hv20 per 1-mm depth.

4 Claims, 6 Drawing Sheets

VARIATOR DISC AND A METHOD OF FABRICATING THE SAME

BACKGROUND OF THE INVENTION

The present invention relates to a variator disc mounted in a toroidal continuously variable transmission and a method of fabricating the same.

FIG. 6 is a schematic diagram showing a variator for use in a toroidal continuously variable transmission mounted in vehicles and the like. The variator 10 includes an input shaft 13 driven into rotation by a vehicular power source 12. The input shaft 13 carries an input disc 15 on respective places near opposite ends thereof. These input discs 15 are each formed with a spline hole 15a at a center thereof, the spline hole formed with plural lines of spline grooves. The input disc 15 has the spline hole 15a meshed with a spline shaft 13a of the input shaft 13 so that the input disc is rotated in unison with the input shaft 13 as permitted of a minor movement axially of the input shaft 13. The input disc 15 is further formed with a concave race 15b on one side surface thereof.

An output portion 18 of the variator 10 is relatively rotatably carried on an axially central portion of the input shaft 13. The output portion 18 includes an output member 19 and a pair of output discs 20 integrally rotatably carried on the output member 19. The output disc 20 is formed with a concave race 20b on one side surface thereof in face-to-face relation with the race 15b of the input disc 15. The output member 19 is formed with a spline shaft 19c on each of the outer peripheries of opposite ends thereof. The spline shaft 19c is meshed with a spline hole 20c formed at the output disc 20. The output member 19 is further formed with a sprocket gear 19a on an outer periphery of its central portion, the sprocket gear meshed with a power transmission chain 23. Three disc-like rollers 21 are interposed between the race 15b of the input disc 15 and the race 20b of the output disc 20 in face-to-face relation. The rollers 21 are in rolling contact with the races 15b, 20b, as arranged with equal circumferential spacing. Each of the rollers 21 is rotatably carried by a carriage 22, and is adapted to be adjusted for its position relative to the races 15b, 20b by means of the carriage 22.

Thus, the variator 10 is configured as a so-called double cavity type which includes a pair of sets, each of which consists of the input disc 15, output disc 20 and rollers 21. The variator is arranged such that the input discs 15 transmit torque to the output discs 20 via the six rollers 21. The variator is adapted to vary the speed of rotation (transmission gear ratio) of the output discs 20 by adjusting the positions of the six rollers 21 by means of the carriages 22 (see two-dot chain line in FIG. 6).

The input disc 15 is formed from, for example, a bearing steel. The input disc is generally fabricated by the steps of heat treating a blank for hardening, the blank formed with the spline hole 15a and the concave race 15b by machining; finishing the spline hole 15a by broaching; and then finishing the race 15b by machining or grinding using an inside periphery (surface of minimum inside diameter) of the spline hole 15a as a working reference.

The variator 10 is required to maintain the individual rollers 21 in contact with the races 15b, 20b of the discs 15, 20 at high contact pressure in order to ensure the torque transmission between the input discs 15 and the output discs 20. Hence, it is a general practice to specify Vickers hardness (Hv) of the race surfaces 15b, 20b to be 700 or more thereby ensuring the fatigue strength of the races 15b, 20b.

However, the heat treatment of the discs 15, 20 generally includes the steps of charging the blank in an oven for heating the whole body of the blank in high temperature atmosphere; quenching the blank; and tempering the same. Accordingly, the overall surface of the blank is hardened to the hardness of not less than Hv700 which is required of the races 15b, 20b. In a case where the spline hole 15a, 20c of the disc 15, 20 is subjected to an excessive load resulting from unbalanced load or the like, the spline hole 15b, 20b may develop cracks at its bottom and the cracks may further develop to cause fracture of the disc 15, 20 at worst. Furthermore, since the spline holes 15b, 20b are low in machinability, it is difficult to broach the heat treated spline holes 15b, 20b. This results in the increase of the machining cost.

OBJECT OF THE INVENTION

It is an object of the invention to provide a variator disc capable of preventing the occurrence of cracks in its spline hole.

It is another object of the invention to provide a variator disc facilitating the finishing of the heat treated spline hole.

It is still another object of the invention to provide a fabrication method for variator disc which facilitates the fabrication of the inventive disc.

SUMMARY OF THE INVENTION

A variator disc in accordance with the invention is used in a variator of a toroidal continuously variable transmission, the disc including a concave race at least on one side surface thereof for rolling movement of rollers; and a spline hole at its center which is meshed with an input shaft; and having a surface hardness of not less than Hv700 at the race; and a surface hardness of not more than Hv600 at the spline hole; wherein at least a thin portion between the spline hole and an inside circumferential edge of the race is varied in hardness between a hardened layer of a bottom of the spline hole and a hardened layer of the race by an amount of not less than Hv20 per 1-mm depth.

According to the variator disc thus arranged, even if the spline hole is subjected to an excessive load, the occurrence of cracks at the bottom of the hole can be prevented because the spline hole has the surface hardness of not more than Hv600. Furthermore, the spline hole is easy to finish by machining and hence, the machining cost therefor is reduced. In addition, at least the thin portion is varied in hardness between the hardened layer of the bottom of the spline hole and the hardened layer of the race by the amount of not less than Hv20 per 1-mm depth. Because of such a great rate of the hardness variation, the thin portion need not be increased in thickness but the hardened layer of the spline hole can be decreased in hardness while a sufficient hardness of the hardened layer of the race is maintained as it is. Accordingly, the race has a sufficient depth of hardened layer in the thin portion, as well, so that the race can exhibit a favorable durability. If the amount of hardness variation is less than Hv20 per 1-mm depth, the thin portion must be increased in thickness in order to achieve an adequate hardness of the hardened layer of the race. This leads to the need for accordingly increasing the outside diameter of the disc. According to the invention, however, the hardened layer of the spline hole can be decreased in hardness without entailing an unwanted increase of the outside diameter of the disc.

A method of fabricating the variator disc of the invention comprises the steps of: heat treating a blank for the disc for adjusting a surface hardness thereof to not less than Hv700; annealing the spline hole by high frequency heating while cooling the race; and finishing the spline hole and the race.

According to this method, the spline hole of the disc is annealed while cooling the race of the disc. Therefore, the race is prevented from being decreased in hardness by the thermal influence of the annealing of the spline hole. In addition, at least the thin portion can be effectively varied in hardness between the hardened layer of the bottom of the spline hole and the hardened layer of the race. Accordingly, the disc of the invention can be fabricated easily.

According to the method of fabricating the variator disc, it is preferred that a cooling jig is positioned in parallel with the race as defining a minor gap therebetween and that the race is cooled by circulating a coolant through the cooling jig. This provides for an effective decrease of the thermal influence on the race during the high frequency heating of the spline hole.

It is preferred that the minor gap between the race and the cooling jig is in the range of 0.3 to 0.5 mm. In this case, the race can be cooled in an easy and stable manner.

DETAILED DESCRIPTION OF THE PREFERRED EMBODIMENT

The invention will hereinbelow be described in detail with reference to the accompanying drawings illustrating the preferred embodiment thereof.

Figure 1:
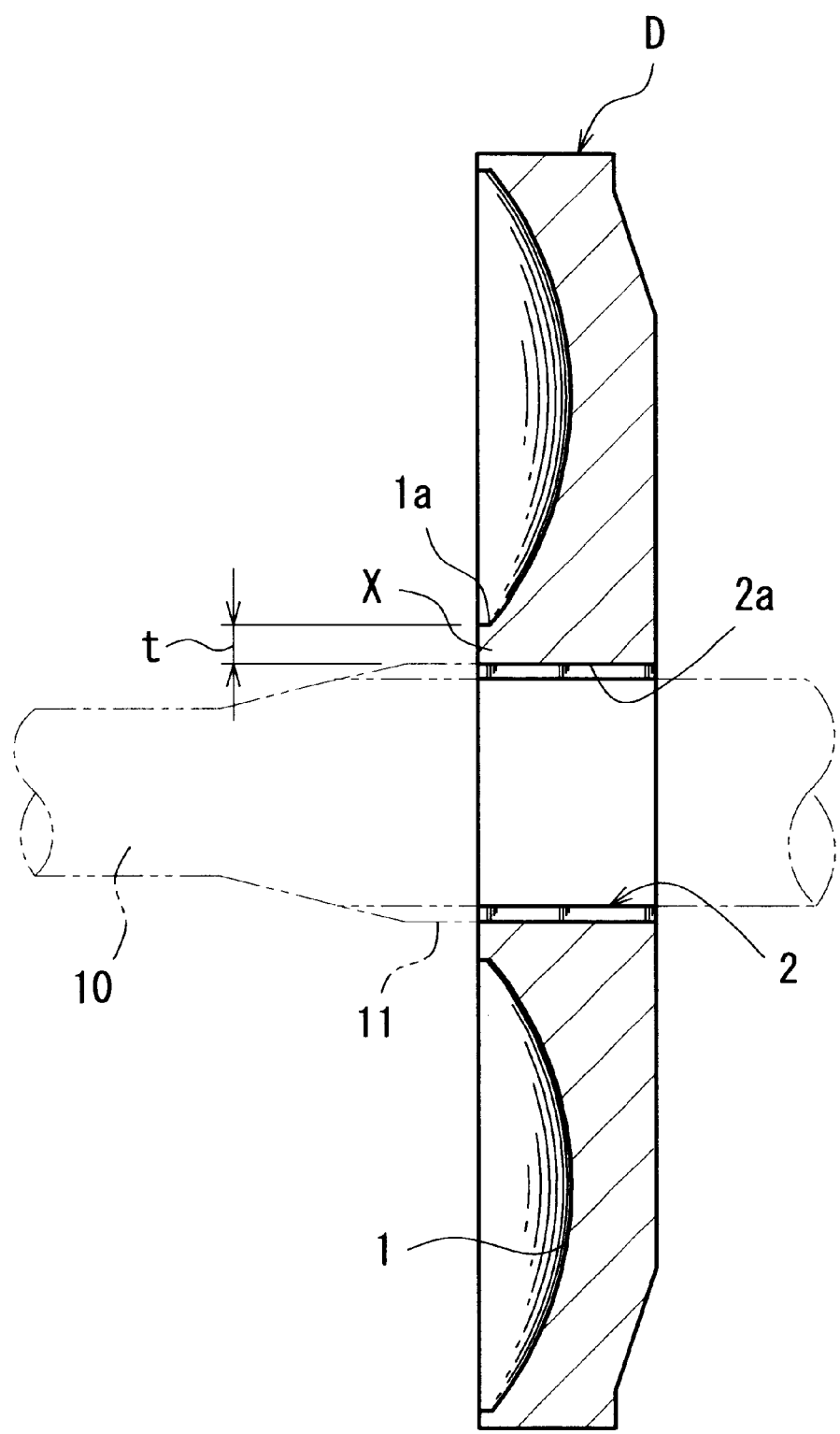
FIG. 1 is a sectional view showing a variator disc according to the invention.

FIG. 1 is a sectional view showing a variator disc according to the invention. The disc D is an annular one used as an input disc or an output disc of the variator. A race 1 defined by a concave surface is formed on one side surface of the disc D, whereas a spline hole 2 to be meshed with a spline shaft 11 of an input shaft 10 is formed on an inside periphery of a central portion of the disc D. A thin portion X between a bottom 2a of the teeth of the spline hole 2 of the disc D and an inside circumferential edge 1a of the race 1 thereof has a thickness t defined to range from several millimeters to a dozen millimeters.

Figure 2:
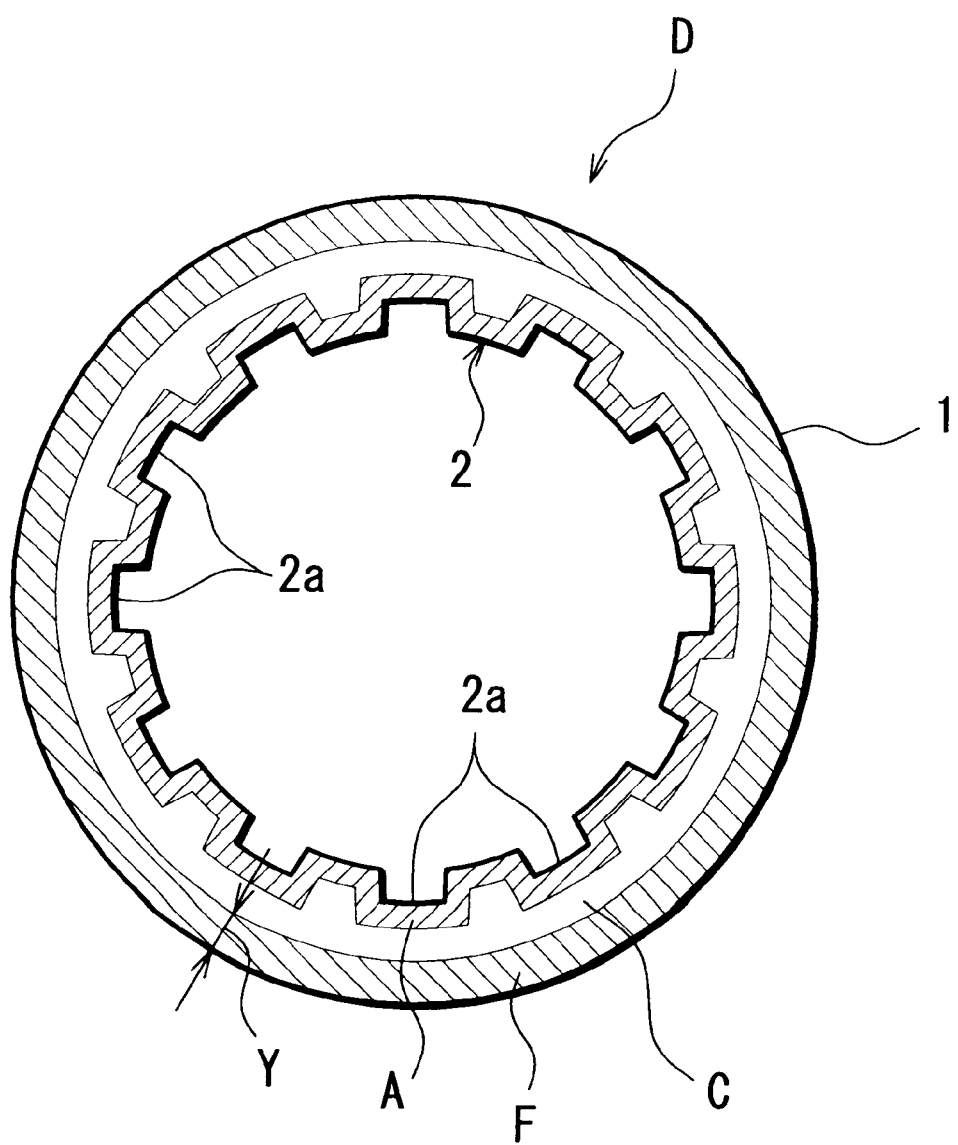
FIG. 2 is an enlarged sectional view showing an essential part of the above figure.

The disc D is formed from a high-carbon steel such as heat resisting bearing steel and the like, having a surface hardness of not less than Hv700 at the race 1 thereof and a surface hardness of not more than Hv600 at the spline hole 2 thereof. At least in the thin portion X, a portion C between a hardened layer A of the bottom 2a of the spline hole 2 and a hardened layer F of the race 1 (both are shown in FIG. 2) is varied in hardness by an amount of not less than Hv20 per 1-mm depth.

Figure 3:
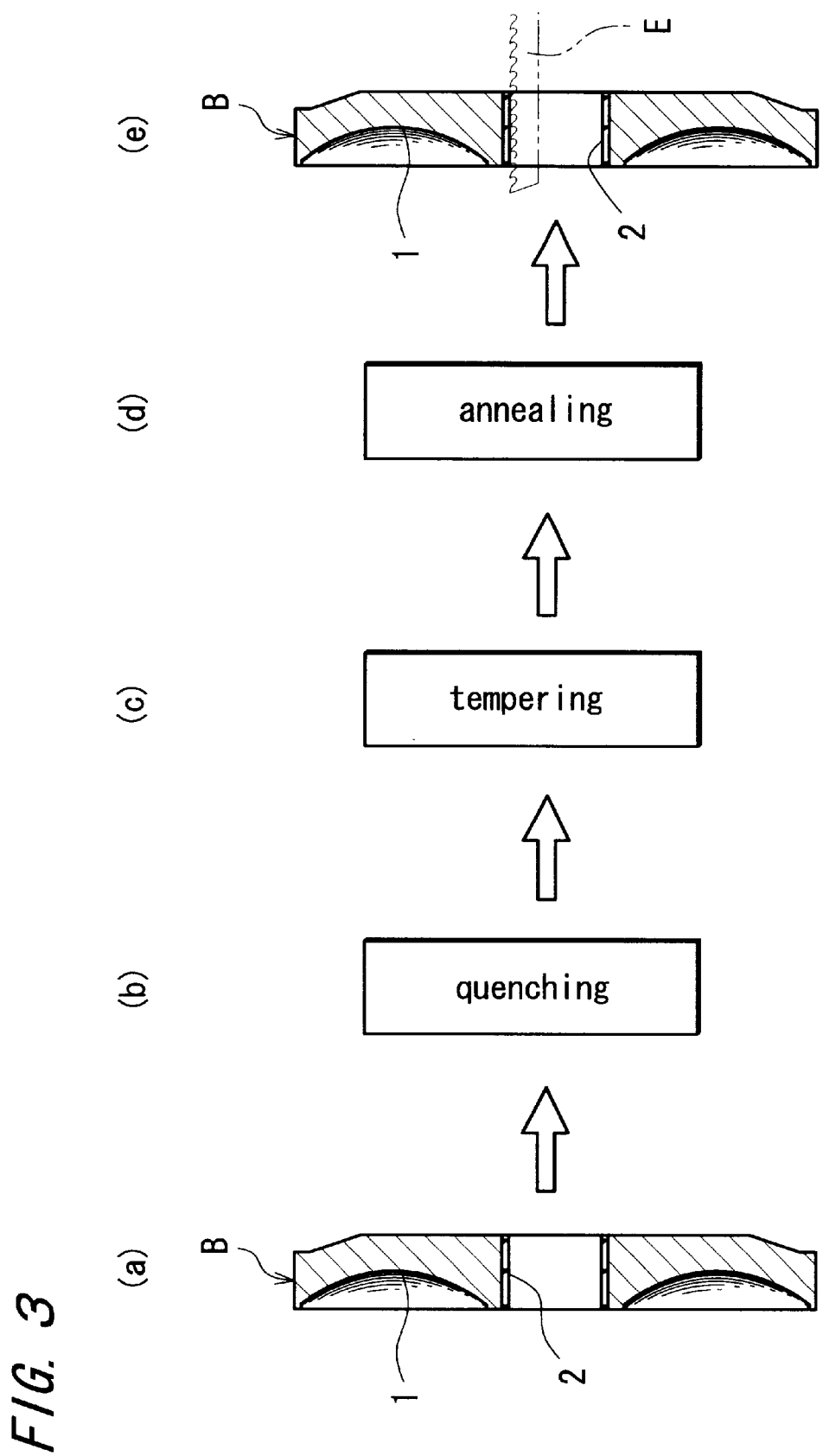
FIG. 3 is a group of diagrams illustrating steps of a method of fabricating the variator disc of the invention.

Next, a method of fabricating the disc D will be described with reference to FIG. 3.

First, a blank B is obtained by the steps of machining a forged ring-like material for forming the race 1 on one side surface thereof and machining the other side surface and an outer periphery of the material into predetermined shapes; and then forming the spline hole 2 centrally of the material by means of a broach (see FIG. 3a). The machining of these portions are performed in a manner to allow for predetermined machining allowances in consideration of heat-treatment deformations. Next, the blank B is charged in an oven for heating the whole body of the blank B for a given period of time in high temperature atmosphere. Subsequently, the blank B is quenched by oil quenching or the like (see FIG. 3b). The blank B thus hardened is further subjected to tempering for adjusting the overall surface hardness to Hv700 or more and for removing residual stress (see FIG. 3c).

Subsequently, an area of the spline hole 2 of the tempered blank B is heated by high frequency heating and then subjected to slow cooling in the atmosphere. Thus, the area of the spline hole 2 is annealed (see FIG. 3d) thereby adjusting the surface hardness thereof to Hv600 or less. The area of the spline hole 2 is heated while cooling the race 1 so that the race 1 is prevented from thermally affected. It is preferred in this process to preheat the whole body of the blank B to about 100 to 200° C. thereby uniformly raising the temperature thereof such that dimensional variations, cracks or the like may not be caused by the influence of a rapid temperature change at the annealed surface area. In a case where the blank is uniformly raised in temperature, it is easy to prevent the occurrence of dimensional variations, cracks and the like. This also makes it possible to achieve a greater amount of hardness variation at the portion C between the hardened layer A of the bottom 2a of the spline hole 2 and the hardened layer F of the race 1.

Figure 4:
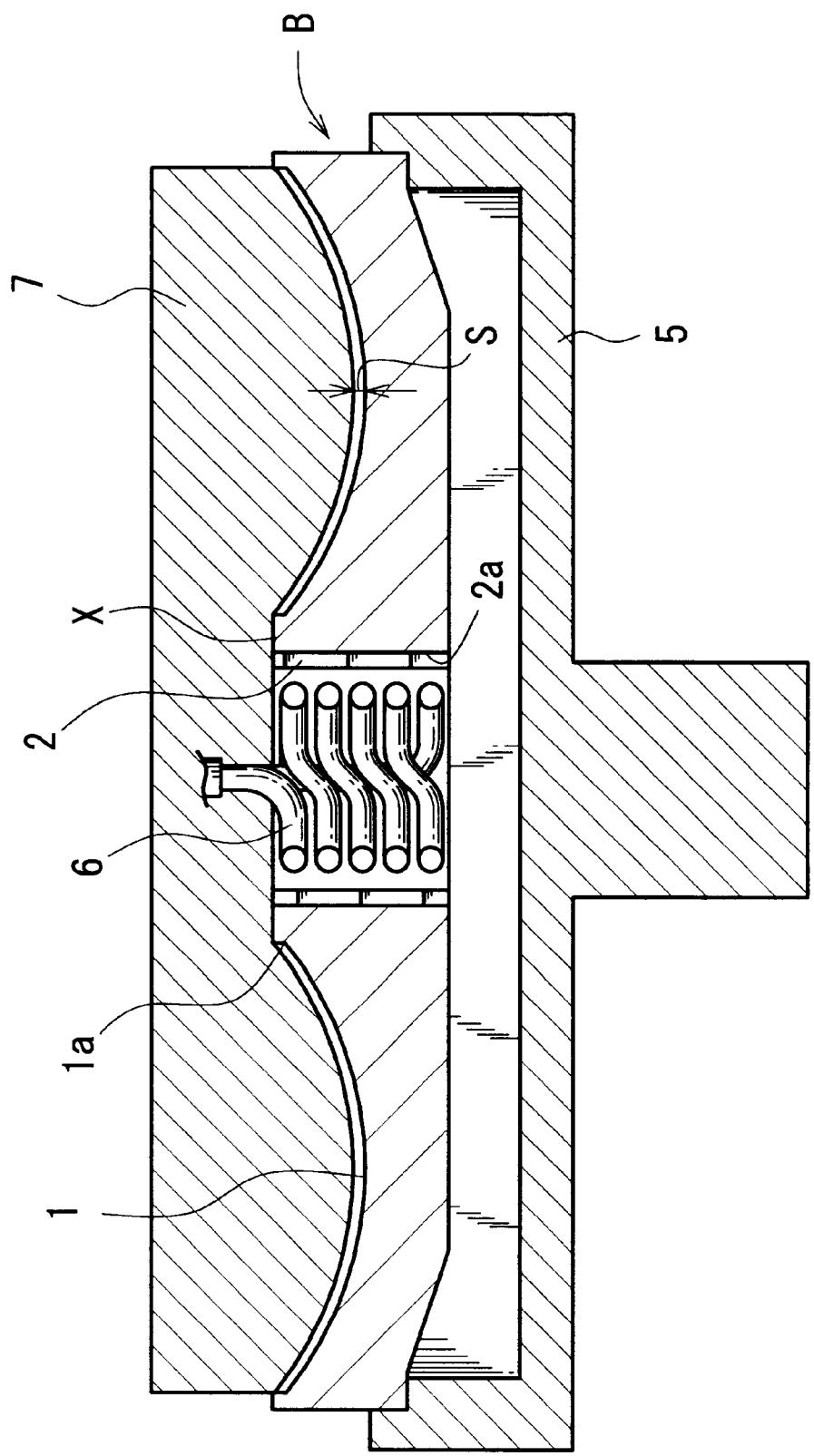
FIG. 4 is a schematic diagram illustrating an annealing method.

FIG. 4 is a schematic diagram showing a specific example of the heating method for annealing. As shown in the figure, the heating is performed in a state where the blank B with its race 1 faced upward is retained on a workpiece rest 5 which can be driven into rotation, and an induction heating coil 6 is inserted in the spline hole 2 of the blank. On the other hand, an annular cooling jig 7 having its surface curved in conformity with the race 1 of the blank B is set in parallel with the race 1 as defining a minor gap S therebetween. The minor gap S is defined to range from 0.3 to 0.5 mm, or more preferably from 0.4 to 0.45 mm. The provision of the minor gap S provides for an easy and stable cooling of the race 1. Specifically, if the gap S exceeds 0.5 mm, it is difficult to cool the race 1 effectively. If the gap S is less than 0.3 mm, the cooling jig 7 is thermally expanded to slide on the race 1 of the blank B. This results an instable cooling conditions. That is, the control of the gap S is an important factor of the mass production of the disc D. It is noted that the cooling jig 7 is formed of a metal having a high thermal conductivity, such as copper or the like, and that a cooling water as a coolant is circulated through the jig.

In the above state, the high frequency heating is applied to the spline hole 2 area by activating the coil 6 with the workpiece rest 5 rotated at a rotational speed of, say, 100 to 120 rpm. In this process, the race 1 can be cooled by means of the cooling jig 7 and hence, the race 1 may not be overheated to be decreased in the hardness thereof.

The heating of the spline hole 2 is performed by the steps of preheating, heat release, and heating in this order, thereby uniformly heating the overall spline hole. Thus, the thin portion X is prevented from sustaining cracks which result from temperature difference between the race 1 of the disc D and the spline hole 2 thereof.

When the heating of the spline hole 2 is completed, the blank B is subjected to slow cooling in the atmosphere.

Thus, the spline hole 2 is tempered while maintaining the hardness of the race 1 at Hv700 or more, whereby the surface hardness of the spline hole 2 is adjusted to Hv600 or less and whereby at least the thin portion X has the hardness varied between the hardened layer A of the bottom 2a of the spline hole 2 and the hardened layer F of the race 1 by the amount of not less than Hv20 per 1-mm depth.

After finishing the spline hole 2 by means of a broach E (see FIG. 3e), the race 1, the side surface and the outer periphery are finished by machining or grinding using the resulting inside periphery of the hole as a working reference. The broaching of the spline hole 2 may be done easily and efficiently because the spline hole is decreased in the surface hardness. Hence, the machining cost can be reduced.

Since the disc D thus fabricated has the surface hardness of not more than Hv600 at the spline hole, the spline hole 2 may be imparted with a given degree of toughness. Therefore, if the spline hole 2 is subjected to an excessive load, the occurrence of cracks at the bottom 2a thereof is prevented. On the other hand, at least the thin portion X has the hardness varied between the hardened layer A of the bottom 2a and the hardened layer F of the race 1 by the amount of not less than Hv20 per 1-mm depth. That is, there is a sharp hardness variation between these layers such that the thin portion X also achieves a sufficient depth Y of the hardened layer of the race. Furthermore, the race 1 and the spline hole 2 can be adjusted to optimum hardnesses without increasing the thickness of the thin portion X. This negates the need for an unwanted increase of the outside diameter of the disc D.

EXAMPLE

A blank for a variator disc was constructed from the following material and heat treated for hardening the overall surface hardness thereof to Hv700 or more. Subsequently, a high frequency heating equipment shown in FIG. 4 was operated for annealing the spline hole under the following conditions.

Figure 5:
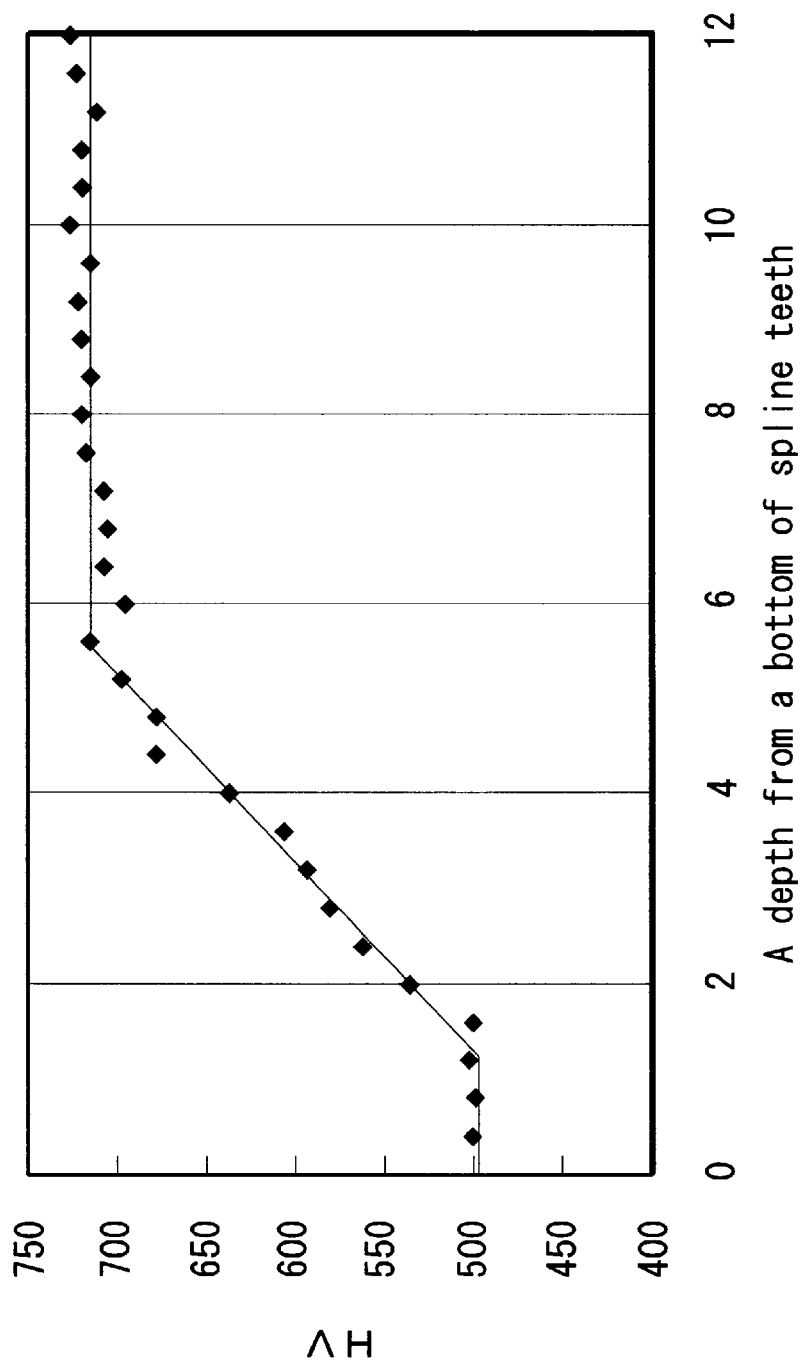
FIG. 5 is a graph representing the distribution of hardnesses of a thin portion.
Figure 6:
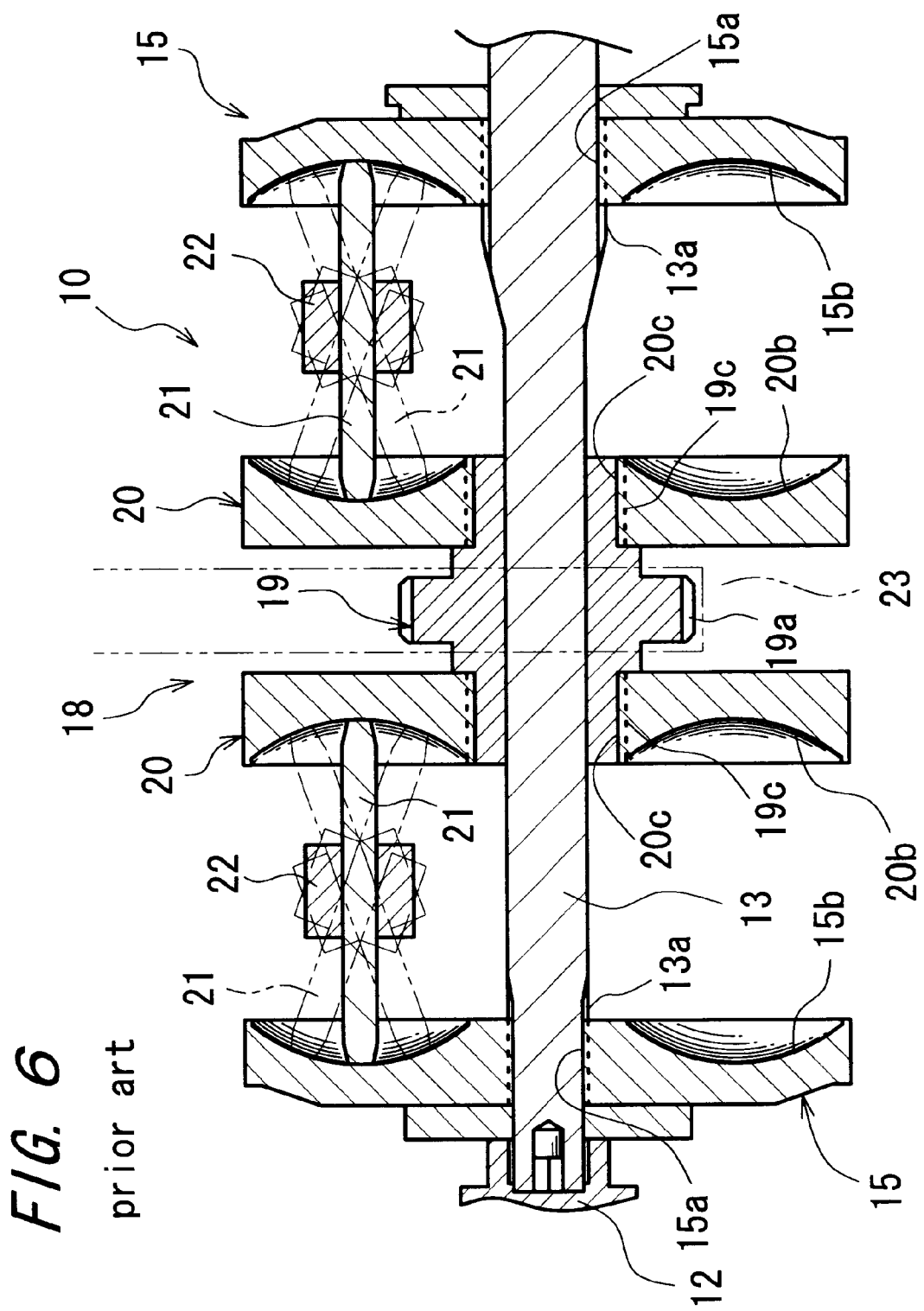
FIG. 6 is a schematic diagram showing a variator.

1) Material: heat resisting bearing steel (outside diameter: 210 mm, inside diameter: 40 mm, minimum thickness: 15 mm)
   Compositions:
      Carbon (C): content of 0.8–1.5 wt %
      Silicon (Si): content of 0.5–2.0 wt %
      Manganese (Mn): content of 0.3–2.0 wt %
      Chromium (Cr): content of 1.3–1.98 wt %
      Molybdenum (Mo): content of 0.3–1.0 wt %
      Retained iron (Fe) and unavoidable impurities
      Provided that Si+Mo>1.0 wt %
2) Heating conditions
   Frequency: 30 KHz
   Voltage: 4.5 KV
   Heating time: Preheating: 5 seconds
      Heat release: 3 seconds
      Heating: 18 seconds
   Rotational speed of blank: 100–120 rpm
   Gap between the race of the blank and a cooling jig: 0.4–0.45 mm The resulting blank had a surface hardness of Hv704 to 719 at the race and a surface hardness of Hv529 to 579 at the spline hole. It was confirmed from FIG. 5 representing the distribution of hardnesses of the thin portion that the thin portion had the hardness varied between the hardened layer of the bottom of the spline hole and the hardened layer of the race by the amount of not less than Hv50 per 1-mm depth.

Although the foregoing embodiment has illustrated the disc D formed with the concave race 1 only on one side surface thereof, the invention may be, of course, applied to a disc formed with the concave races 1 on both side surfaces thereof.

What is claimed is:

1. A disc for use in a variator of a toroidal continuously variable transmission comprising:

a concave race at least on one side surface thereof for rolling movement of rollers; and a spline hole at its center which is meshed with an input shaft;

said disc having a surface hardness of not less than Hv700 at said race; and having a surface hardness of not more than Hv600 at said spline hole;

wherein at least at a thin portion between said spline hole and an inside circumferential edge of said race is varied in hardness between a hardened layer of a bottom of said spline hole and a hardened layer of said race by an amount of not less than Hv20 per 1-mm depth.

2. A method of fabricating said variator disc of claim 1 comprising the steps of:

heat treating a blank for said disc for adjusting a surface hardness thereof to not less than Hv700;

annealing said spline hole by high frequency heating while cooling said race; and finishing said spline hole and said race.

3. The method of fabricating said variator disc as claimed in claim 2, wherein a cooling jig is positioned in parallel with said race as defining a minor gap therebetween and said race is cooled by circulating a coolant through said cooling jig.

4. The method of fabricating said variator disc as claimed in claim 3, wherein said minor gap between said race and said cooling jig is in the range of 0.3 to 0.5 mm.

* * * * *